United States Patent
Zitz

(10) Patent No.: US 9,966,680 B2
(45) Date of Patent: May 8, 2018

(54) CONTACT CARRIER WITH A BASE BODY AND AT LEAST ONE CONTACT ELEMENT, A TOOL FOR INJECTION MOLDING A CONTACT CARRIER AND A METHOD FOR PRODUCING A CONTACT CARRIER

(71) Applicant: TE Connectivity Germany GmbH, Bensheim (DE)

(72) Inventor: Andreas Zitz, Frankenhardt (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days. days.

(21) Appl. No.: 15/226,987

(22) Filed: Aug. 3, 2016

(65) Prior Publication Data

US 2016/0344123 A1 Nov. 24, 2016

Related U.S. Application Data

(63) Continuation of application No. PCT/EP2015/052257, filed on Feb. 4, 2015.

(30) Foreign Application Priority Data

Feb. 7, 2014 (DE) .......... 10 2014 202 316

(51) Int. Cl.
*H01R 12/72* (2011.01)
*B29C 45/14* (2006.01)
*H01R 12/58* (2011.01)
*H01R 43/24* (2006.01)
*B29L 31/36* (2006.01)

(52) U.S. Cl.
CPC ..... *H01R 12/724* (2013.01); *B29C 45/14065* (2013.01); *B29C 45/14639* (2013.01); *H01R 12/585* (2013.01); *H01R 43/24* (2013.01); *B29C 2045/14122* (2013.01); *B29C 2045/14139* (2013.01); *B29K 2995/0007* (2013.01); *B29L 2031/36* (2013.01)

(58) Field of Classification Search
CPC ..... H01R 12/724; H01R 12/585; H01R 43/24
USPC .......................................... 439/626
See application file for complete search history.

(56) References Cited

U.S. PATENT DOCUMENTS

| 5,030,138 | A | | 7/1991 | Capp et al. | |
|---|---|---|---|---|---|
| 5,403,204 | A | * | 4/1995 | Chishima | H01R 31/08 439/189 |
| 5,749,753 | A | * | 5/1998 | Chishima | H01R 13/113 439/752.5 |
| 6,153,140 | A | * | 11/2000 | Hirai | B29C 33/14 264/272.15 |

(Continued)

FOREIGN PATENT DOCUMENTS

| JP | 2007227163 A | 9/2007 |
|---|---|---|
| WO | 2013092221 A1 | 6/2013 |

OTHER PUBLICATIONS

German Office Action, dated Jan. 19, 2015, 3 pages.

(Continued)

*Primary Examiner* — Alexander Gilman
(74) *Attorney, Agent, or Firm* — Barley Snyder

(57) ABSTRACT

A contact carrier is disclosed. The contact carrier comprises a base body, a contact having a holding section disposed within the base body, and a tool channel extending adjacent to the holding section, the holding section exposed in the tool channel.

15 Claims, 4 Drawing Sheets

(56) References Cited

U.S. PATENT DOCUMENTS

| | | | | |
|---|---|---|---|---|
| 6,217,394 B1* | 4/2001 | Sugie | H01R 13/5208 | 439/587 |
| 6,276,964 B1* | 8/2001 | Shinozaki | H01R 13/424 | 439/595 |
| 6,361,379 B1* | 3/2002 | Ito | H01R 13/4223 | 439/692 |
| 6,505,402 B2 | 1/2003 | Moriwake et al. | | |
| 6,840,820 B2* | 1/2005 | Oda | H01R 13/518 | 439/721 |
| 6,896,560 B2* | 5/2005 | Nakamura | H01R 13/4362 | 439/345 |
| 6,948,986 B2* | 9/2005 | Kojima | H01R 13/432 | 439/595 |
| 7,134,886 B2* | 11/2006 | Okamura | H01R 12/716 | 439/79 |
| 7,204,726 B2* | 4/2007 | Yamashita | H01R 13/4362 | 439/752 |
| 7,241,168 B2* | 7/2007 | Sakurai | H01R 31/085 | 439/511 |
| 8,025,538 B2* | 9/2011 | Hara | H01R 4/64 | 439/723 |
| 8,100,730 B2* | 1/2012 | Hara | H01R 4/64 | 439/721 |
| 8,109,799 B2 | 2/2012 | Schlipf | | |
| 8,137,116 B2* | 3/2012 | Omori | H01R 4/64 | 439/883 |
| 8,398,433 B1* | 3/2013 | Yang | H01R 13/6587 | 439/108 |
| 8,400,772 B2* | 3/2013 | Hortig | H05K 1/141 | 361/729 |
| 8,523,583 B2* | 9/2013 | Ito | H01R 12/721 | 439/108 |
| 8,579,638 B2* | 11/2013 | Schaarschmidt | H01R 12/585 | 439/82 |
| 8,992,251 B2* | 3/2015 | Smutny | H01R 31/08 | 439/511 |
| 9,083,094 B2* | 7/2015 | Teramoto | H01R 4/64 | |
| 9,211,852 B2* | 12/2015 | Omori | H01R 4/64 | |
| 9,252,526 B2* | 2/2016 | Cho | H01R 4/023 | |
| 9,300,093 B2* | 3/2016 | Omori | H01R 4/64 | |
| 9,306,326 B2* | 4/2016 | Nishiyama | H01R 13/4362 | |
| 9,318,821 B2* | 4/2016 | Sunaga | H01R 12/523 | |
| 9,318,827 B2* | 4/2016 | Osada | H01R 13/4223 | |
| 9,362,665 B2* | 6/2016 | Omori | H01R 4/64 | |
| 9,496,108 B2* | 11/2016 | Kawamura | H01H 50/048 | |
| 2001/0006854 A1* | 7/2001 | Moriwake | H01R 43/16 | 439/78 |
| 2003/0060075 A1* | 3/2003 | Nakamura | H01R 13/4223 | 439/345 |
| 2003/0092296 A1* | 5/2003 | Oldenburg | H01R 12/52 | 439/75 |
| 2003/0114027 A1* | 6/2003 | Wurster | H05K 3/366 | 439/82 |
| 2003/0219999 A1* | 11/2003 | Minich | H01R 12/727 | 439/79 |
| 2005/0250356 A1* | 11/2005 | Matsumura | H01R 12/585 | 439/82 |
| 2006/0128185 A1* | 6/2006 | Nakazawa | H01R 31/08 | 439/92 |
| 2010/0071953 A1* | 3/2010 | Ichio | H01R 13/40 | 174/72 A |
| 2013/0330956 A1* | 12/2013 | Shimizu | H01R 13/4223 | 439/345 |

OTHER PUBLICATIONS

PCT International Search Report, dated May 8, 2015, 3 pages.
Abstract of JP2007227163, dated Sep. 6, 2007, 2 pages.
PCT Notification, International Preliminary Report on Patentability and Written Opinion of the International Searching Authority, 16 pages, dated Aug. 18, 2016.

* cited by examiner

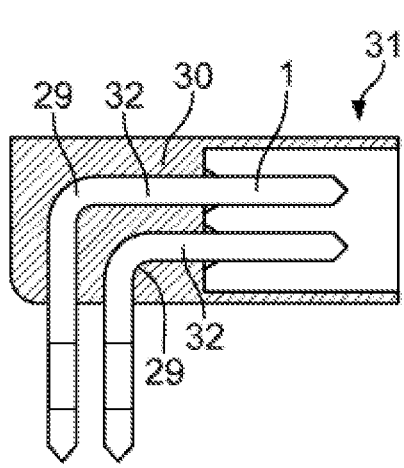
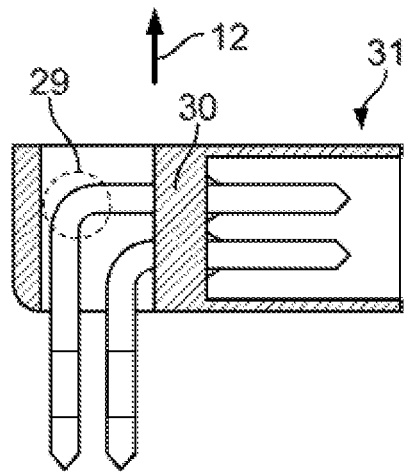
Fig. 7    Fig. 8
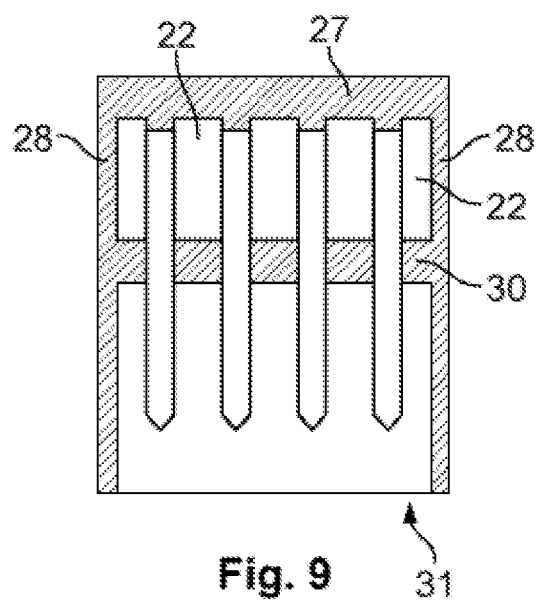
Fig. 9

CONTACT CARRIER WITH A BASE BODY AND AT LEAST ONE CONTACT ELEMENT, A TOOL FOR INJECTION MOLDING A CONTACT CARRIER AND A METHOD FOR PRODUCING A CONTACT CARRIER

CROSS-REFERENCE TO RELATED APPLICATIONS

This application is a continuation of PCT International Application No. PCT/EP2015/052257 filed on Feb. 4, 2015, which claims priority under 35 U.S.C. § 119 to German Patent Application No. 102014202316.5, filed Feb. 7, 2014.

FIELD OF THE INVENTION

The invention relates to a contact carrier, and more particularly, to a contact carrier with a base body and a contact.

BACKGROUND

It is known in the art to injection mold a contact carrier around a contact. A contact section of the contact is introduced into a receiver of a tool during the injection molding, in order to leave the contact section exposed after the injection molding. The tool receiver is sealed in the prior art, for example, by shoulders disposed on the contact or by a movable element. These two prior art solutions, however, are relatively complex; either the shoulder must additionally be molded, or the movable element must be moved to produce the contact carrier.

SUMMARY

An object of the invention, among others, is to provide a contact carrier which can be produced more easily and less expensively. The disclosed contact carrier comprises a base body, a contact having a holding section disposed within the base body, and a tool channel extending adjacent to the holding section, the holding section exposed in the tool channel.

BRIEF DESCRIPTION OF THE DRAWINGS

The invention will now be described by way of example with reference to the accompanying figures, of which:

FIG. 7 is a sectional side view of the contact carrier, taken along line VII-VII of FIG. 6;

FIG. 8 is a sectional side view of the contact carrier, taken along line VIII-VIII of FIG. 6; and FIG. 9 is a sectional top view of the contact carrier, taken along line IX-IX of FIG. 6.

DETAILED DESCRIPTION OF THE EMBODIMENT(S)

The invention is explained in greater detail below with reference to embodiments of a contact carrier. This invention may, however, be embodied in many different forms and should not be construed as limited to the embodiments set forth herein; rather, these embodiments are provided so that this disclosure will be thorough and complete and still fully convey the scope of the invention of those skilled in the art.

Figure 3:
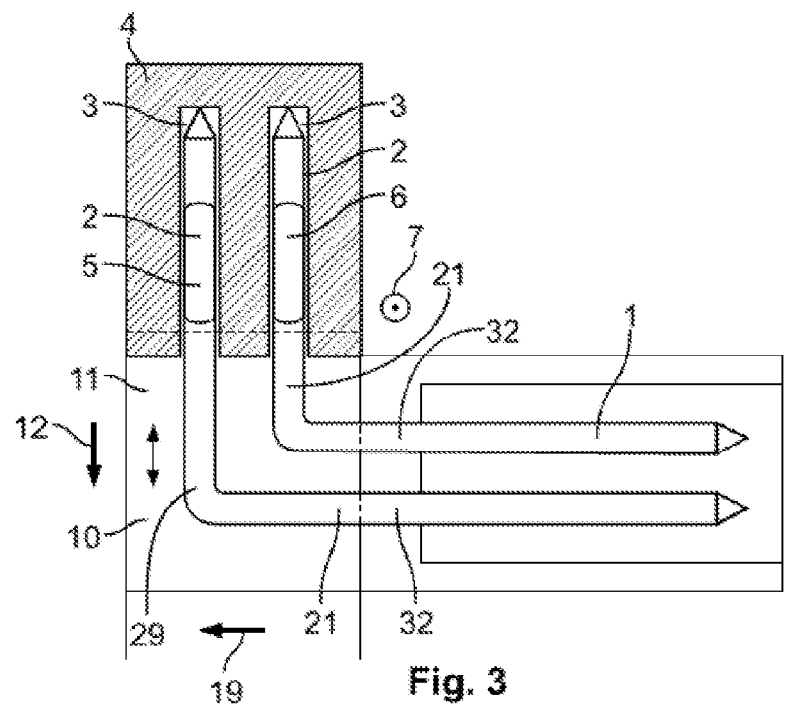
FIG. 3 is a sectional side view of the plurality of contacts and tools, taken along line III-III of FIG. 1.
Figure 4:
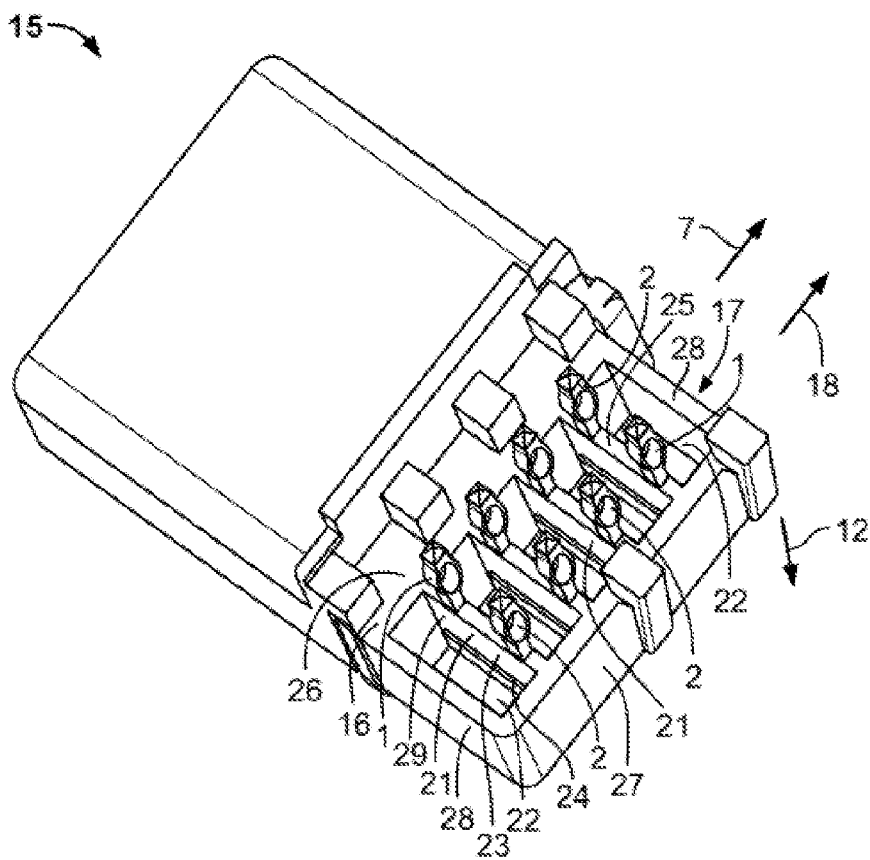
FIG. 4 is a bottom perspective view of a contact carrier according to the invention.
Figure 5:
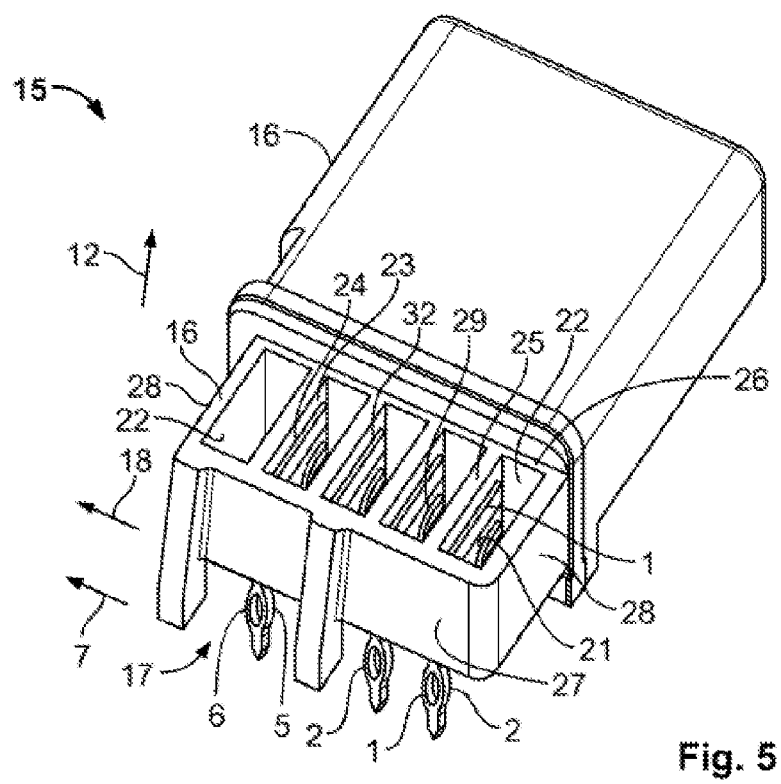
FIG. 5 is a top perspective view of the contact carrier of FIG. 4.
Figure 6:
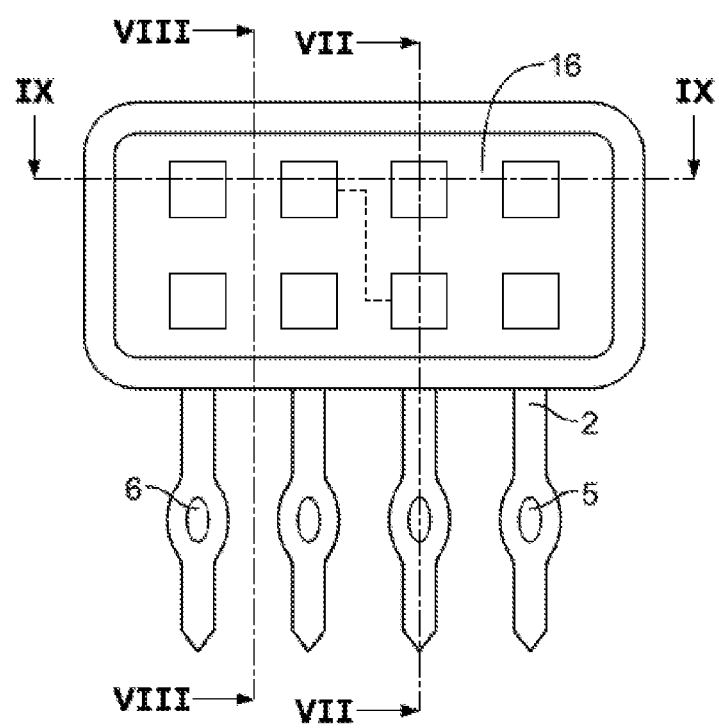
FIG. 6 is a front view of the contact carrier of FIG. 4.

A contact carrier 15 according to the invention is shown in FIGS. 4 and 5. Production of the contact carrier 15 will first be described with reference to FIGS. 1-3.

Figure 1:
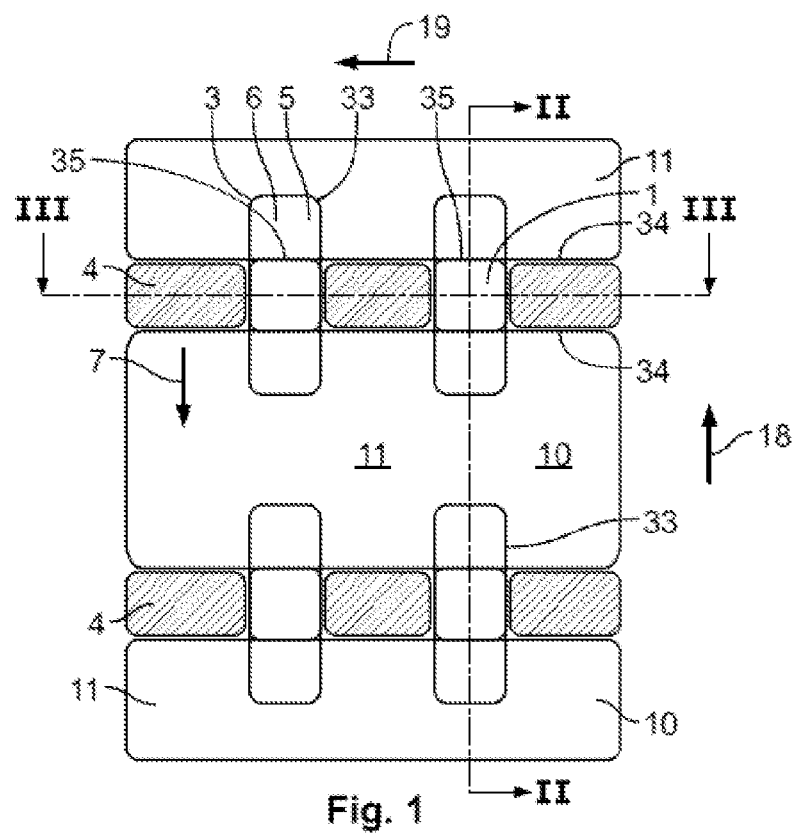
FIG. 1 is a sectional top view of a plurality of contacts and tools according to the invention.
Figure 2:
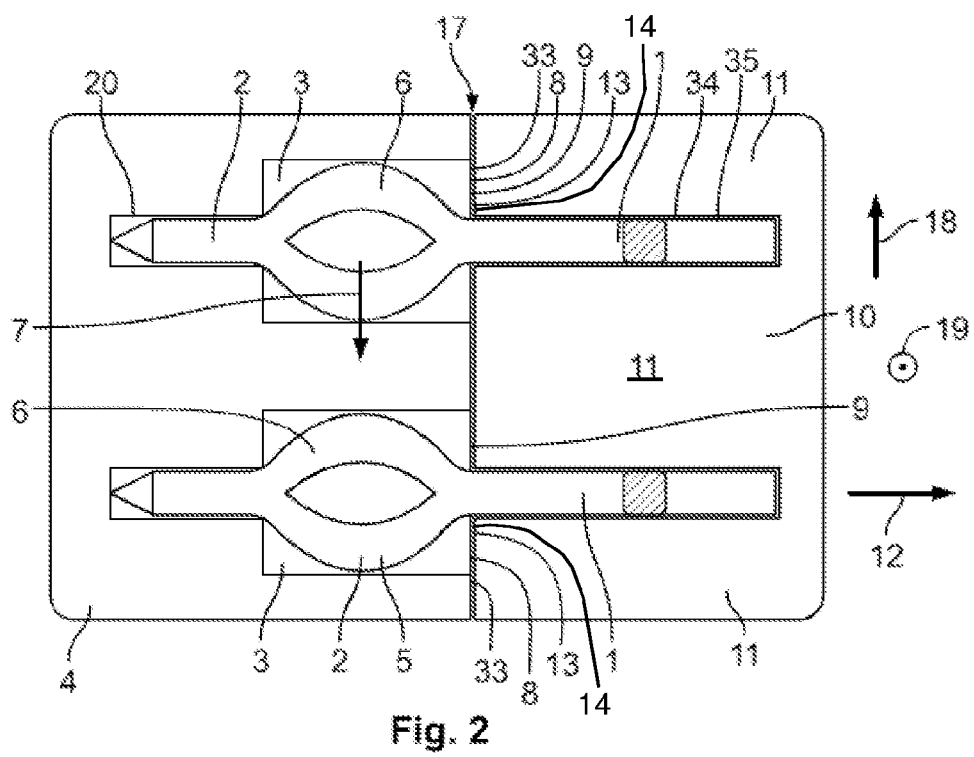
FIG. 2 is a sectional front view of the plurality of contacts and tools, taken along line II-II of FIG. 1.

As shown in FIGS. 1-3, a plurality of contacts 1 each has a contact section 2. Each contact section 2 has a thickened portion 5 in the form of a spring element 6 that has been molded by stamping into the contact 1. In the region of the thickened portion 5, the contact section 2 is thickened in both a thickened direction 7 and a direction counter to the thickened direction 7. In the shown embodiment, the thickened portion 5 is in the shape of an eye of a needle, so that it can be compressed elastically and generates a high holding force. As shown in FIG. 3, the contacts 1 are angled at a holding section 21. The holding sections 21 have bent sections 32 with curves 29.

The contacts 1 of the shown embodiment have a substantially square cross-section. As would be understood by one with ordinary skill in the art, the contacts 1 can also have a different cross-section, for example a circular cross-section. Furthermore, the contacts 1 may be bent from a wire-shaped material, but can also be molded, for example, from a metal sheet by means of a stamping process.

The contact section 2 is inserted into a receiver 3 of a contact tool 4. An opening surface 8, which delimits the receiver 3, has open regions 9 when the contact 1 is inserted into the receiver 3. When the contact 1 is inserted, the opening surface 8 is only partially stressed by the surface of the contact 1. The contacts 1 can be arranged one behind the other in a row, the receivers 3 respectively having open regions in the direction of a row when the contacts 1 are inserted into the receivers 3.

The contact 1 is held stable in the receiver 3 by the thickened portion 5. Alternatively, the contact section 2 could also have no thickened portion 5 and be configured with a continuously identical cross-section, and could then be fixedly held in the front region 20 of the receiver 3. In a further alternative, the receiver 3 could be produced with a cross-section corresponding to a continuously identical cross-section of the contact section 2 and a seal according to the invention would not necessarily be required.

In order to prevent injection molding material from flowing into the receiver 3 during a subsequent injection molding step, a body tool 10 is positioned to seal the open regions 9. The body tool 10 is movable in a demolding direction 12 between an abutting position abutting the contact tool 4, shown in FIG. 2, and a withdrawn position separated from the contact tool 4.

The body tool 10 has a plurality of supports 11 extending in the demolding direction 12 and rigidly connected to the body tool 10. The supports 11 can be molded as a stamp or projection. The supports 11 can extend away, self-supporting, from a rear side of the body tool 10 or be connected at least partially to a side part of the body tool 10 extending transversely to the demolding direction 12. The cross-section of the supports 11 is consistent in the demolding direction 12, and can be round, rectangular or any other shape known to those with ordinary skill in the art. The contacts 1 are inserted between the supports 11 such that side surfaces 34 of the supports 11 rest against side surfaces 35 of the contacts 1.

In the abutting position shown in FIG. 2, each support 11 rests against an edge 33 of the receiver 3 and at least partially covers the edge 33. Front surfaces 13 of the supports 11 rest against the opening surface 8, and thus reduce the cross-sectional area of the receiver 3 in the region of the opening surface 8. The front surfaces 13 and opening surfaces 8 abut one another to form a separating surface 14. Alternatively, the support 11 may protrude into the receiver 3 to seal the contact tool 4 with respect to the body tool 10.

As shown in FIGS. 1 and 2, a support 11 may at least partially seal a number of receivers 3 at the same time; the support 11 positioned in the center in FIG. 2 seals the upper receiver 3 at the bottom and the lower receiver 3 at the top. The central support 11 in the shown embodiment is wider than the other supports 11 and is and more stable in a row direction 18. As also shown in the embodiment of FIG. 1, the central support 11 not only simultaneously covers two receivers 3 lying one behind the other in a row direction 18, but also extends in a transverse direction 19 over two rows of contacts 1. In this case, in the embodiment shown in FIG. 1, the central support 11 simultaneously seals four receivers 3.

An injection molding material is injected into a mold shown in FIG. 3 formed partially by the contact tool 4 and the body tool 10 in the abutting position. The holding sections 21 are held by the supports 11, and after the injection molding, the injection molded material holds the holding sections 21. The body tool 10 is pulled away from the contact tool 4 in the demolding direction 12 into the withdrawn position after the injection molding step to form the finished contact carrier 15; the separating surface 14 separates a base body 16 of the contact carrier 15 from a contact region 17 having the exposed contact sections 2, shown in FIG. 4.

The contact carrier 15 according to the invention will now be described in greater detail with reference to FIGS. 4-9.

As shown in FIGS. 4 and 5, the contact sections 2 protrude from the base body 16 at the contact region 17. The holding sections 21 are disposed within the base body 16, and the contacts 1 are isolated from one another by the insulating injection molding material forming the base body 16.

Tool channels 22 are produced by the supports 11 during the injection molding, and extend adjacent to the holding sections 21. The holding sections 21 are disposed between the tool channels 22 and exposed in some areas in the tool channels 22. In the shown embodiment, the holding section 21 of a single contact 1 is exposed in two tool channels 22, and the holding sections 21 of a number of contacts 1 are exposed in a single tool channel 22. The tool channels 22 respectively have level tool channel walls 23 which are flush with surfaces 24 of the holding section 21. The tool channels 22 are continuous through the base body 16 and have a consistent cross-section in the demolding direction 12.

A plurality of bridges 25 extends between an inner wall 26 and an outer wall 27 of the base body 16. The contact sections 2 protrude from the bridges 25; in the embodiment shown in FIGS. 4 and 5, two contact sections 2 protrude from each bridge 25. For additional stabilisation, two side walls 28 are also disposed between the inner wall 26 and the outer wall 27.

In the region of the contact sections 2 and in the regions of the holding sections 21 adjacent to the contact sections 2, the contacts 1 run in the demolding direction 12 parallel to the tool channels 22. In the region of the bent sections 32, on the other side of curves 29, the holding sections 21 run perpendicular to the demolding direction 12.

The holding sections 21 are guided out of a region with the tool channels 22 and then lie at least partially in a solid region 30 completely filled with injection molded material, shown in FIGS. 7-9. In the solid region 30, the entire space is filled either by the contacts 1 or by the injection molding material. An end 31 on the connection side and in which the contacts 1 can be connected, for example, to a terminal (not shown), lies behind the solid region 30.

In the contact region 17, the thickened portions 5 project above the tool channels 22.

The tool channels 22, shown open in FIGS. 4-9, can alternatively be filled in or filled up, for example, with the same material as used for the base body 16. In a further alternative, the tool channels 22 can also be covered by covering elements in order to avoid undesired contact with the exposed holding sections 21.

In the finished contact carrier 15, the thickened portion 5 can, for example, be used to generate a press-fit connection between the contact 1 and a counter-element (not shown), which can be a printed circuit board. The solid region 30 provides stability for the contacts 1 during press-fitting. Solder-less contacting of a printed circuit board can therefore be achieved with the contact carrier 15.

Advantageously, according to the contact carrier 15 of the present invention and the method of forming the contact carrier 15, since the support 11 extends in the demolding direction 12, the body tool 10 can be released from the contact tool 4 and the contact carrier 15 without any problem after the injection molding material has hardened. A special configuration of the contacts 1 with shoulders or a moveable part within the tools 4, 10, increasing construction and production complexity, is therefore not required. The production complexity for the tools 4, 10 is further lowered since only a small number of supports 11 are produced. Additionally, the resultant contact carrier 15 is stable since a comparably large amount of injection molding material can be used.

What is claimed is:

1. A contact carrier, comprising:
   a base body;
   a plurality of contacts each having a holding section disposed within the base body; and
   a tool channel extending continuously through the base body adjacent to the holding sections, the holding sections of the plurality of contacts are exposed in the single tool channel.

2. The contact carrier of claim 1, wherein the tool channel has a tool channel wall that is flush with a surface of the holding section.

3. The contact carrier of claim 1, wherein the contact has a contact section extending away from the base body.

4. The contact carrier of claim 3, wherein the contact section has a thickened portion.

5. The contact carrier of claim 1, wherein the contact carrier has a plurality of tool channels and the holding section of one of the contacts is exposed in the plurality of tool channels.

6. The contact carrier of claim 1, wherein the holding section of one of the contacts is disposed between two tool channels.

7. The contact carrier of claim 1, wherein the holding section has a bent section.

8. A tool for injection molding a contact carrier, comprising:
   a contact tool having a receiver in which a contact section of a contact is disposed, the receiver including an opening surface; and
   a body tool having a support extending in a demolding direction, the body tool movable in the demolding direction between an abutting position abutting the contact tool and a withdrawn position separated from the contact tool, the support having a front surface abutting an edge of the receiver, the front surface partially covering the receiver and reducing a cross-sectional area of the opening surface in the abutting position.

9. The tool of claim 8, wherein the front surface and the opening surface form a separating surface in the abutting position.

10. The tool of claim 8, wherein the contact tool has a plurality of receivers.

11. The tool of claim 10, wherein a single support reduces the cross-sectional area of the opening surface of the plurality of receivers.

12. A method for producing a contact carrier, comprising:
inserting a contact into one of a plurality of receivers of a contact tool;
sealing the plurality of receivers simultaneously with a single support of a body tool extending in a demolding direction;
injection molding into a mold including the contact, the contact tool, and the body tool to form a contact carrier; and
removing the body tool in the demolding direction from the contact tool and the contact carrier.

13. The method of claim 12, wherein an opening surface of each of the receivers is sealed by a front surface of the support.

14. A contact carrier, comprising:
a base body;
a contact having a holding section disposed within the base body; and
a plurality of tool channels extending continuously through the base body adjacent to the holding section, the holding section exposed in the plurality of tool channels.

15. A contact carrier, comprising:
a base body;
a contact having a holding section disposed within the base body; and
a plurality of tool channels extending continuously through the base body adjacent to the holding section, the holding section disposed between two tool channels and exposed in the tool channels.

* * * * *